United States Patent [19]

Gibson

[11] 4,328,608

[45] May 11, 1982

[54] PIPELINE BUILDING METHOD AND APPARATUS

[76] Inventor: Jack E. Gibson, 4905 Pepperidge Pl., Odessa, Tex. 79762

[21] Appl. No.: 156,739

[22] Filed: Jun. 5, 1980

[51] Int. Cl.$^3$ .............................................. B23P 19/04
[52] U.S. Cl. ......................................... 29/237; 29/252
[58] Field of Search ........................... 29/237, 238, 252

[56] References Cited

U.S. PATENT DOCUMENTS

| | | | |
|---|---|---|---|
| 1,894,835 | 1/1933 | Smith et al. | 29/238 |
| 3,717,920 | 2/1973 | Oliver et al. | 29/237 |
| 3,727,289 | 4/1973 | Bemelmann et al. | 29/237 |
| 4,189,817 | 2/1980 | Moebius | 29/252 |

FOREIGN PATENT DOCUMENTS

| | | | |
|---|---|---|---|
| 2433946 | 2/1976 | Fed. Rep. of Germany | 29/237 |
| 621844 | 8/1978 | U.S.S.R. | 29/237 |

Primary Examiner—James L. Jones, Jr.

Attorney, Agent, or Firm—Marcus L. Bates

[57] ABSTRACT

Apparatus for forcing threadless joints of pipe axially into a coupling to effect a string of pipe. The apparatus includes a main frame movable longitudinally along the projected path of a pipeline to be constructed. A pipe gripper is mounted to the main frame for slidable movement longitudinally along the pipeline. The pipe gripper comprises a plurality of pipe engaging dies remotely actuated to grip and release a marginal length of a pipe. A coupling holding fixture is affixed to the main frame in spaced relation respective to the pipe gripper. The fixture includes a movable wall which enables a coupling to be releasably held in fixed relationship respective to the main frame, and remotely released when desired. A coupling is placed within the fixture, a joint of pipe is placed within the pipe gripper which forces the pipe axially into the coupling whereupon the pipe connection is effected to thereby enable a pipeline to be fabricated.

5 Claims, 12 Drawing Figures

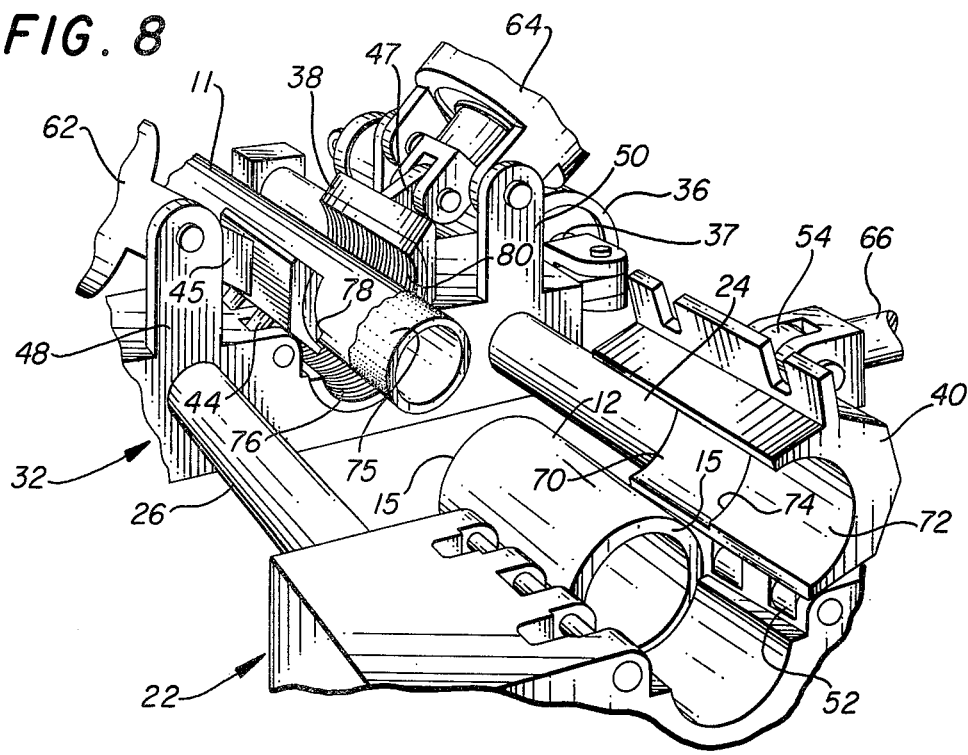
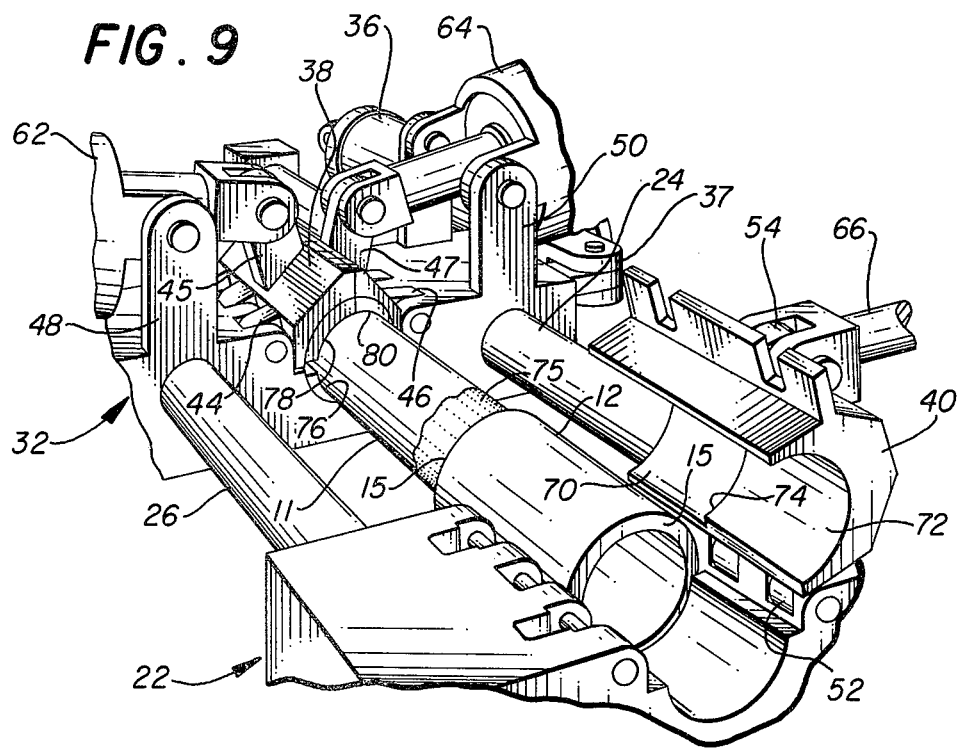

PIPELINE BUILDING METHOD AND APPARATUS

BACKGROUND OF THE INVENTION

In my co-pending patent application Ser. No. 048,780 filed June 15, 1979, there is set forth a method of fabricating a pipeline by the provision of a coupling member having grooves formed therein, with the inside diameter of the grooves being smaller than the outside diameter of the marginal pipe ends, so that when the pipe ends are coated with a suitable resin and forced axially into the coupling, a fluid tight joint is effected which enables the fabrication of a pipeline to be carried out in a new and unobvious manner.

The present disclosure provides method and apparatus by which the marginal end of a pipe can be forced axially into a coupling member made in accordance with my co-pending patent application.

SUMMARY OF THE INVENTION

Pipeline building method and apparatus comprising gripping a marginal length of a pipe joint, capturing a pipe coupling within a fixture, moving the pipe joint axially towards the coupling until a marginal length of the pipe joint has been forced into the coupling.

The coupling is provided with circumferentially extending grooves which grip the pipe joint with great force, and an epoxy resin is applied between the pipe joint and the coupling for sealing and bonding one to the other.

The apparatus of this invention comprises a main frame which supportingly receives a marginal length of a pipeline during construction thereof. A fixture is supported by the main frame, and a pipe coupling is releasably held by the fixture. A pipe gripper has pipe dies which grip a marginal length of a pipe joint. A powerful hydraulic cylinder assembly moves the pipe gripper towards the fixture to cause a marginal end of the pipe joint to be received within the coupling. Remote, actuated, hydraulic cylinder assemblies actuate the pipe gripper and fixture between an opened and closed configuration.

A coupling is placed on a joint of pipe. The pipeline is fabricated with the coupling forming the end of the pipeline. So the boxed end of the last pipe joint forms the terminal end of the pipeline, and the pin end of a pipe joint is applied to the boxed end of the pipeline as the fabrication of the pipeline progresses.

A primary object of this invention is the provision of both method and apparatus by which a pipeline can be fabricated without welding or screwing the pipe joints together, by moving a pin end of a pipe joint axially and forcibly into a box end of another pipe joint.

Another object of the present invention is the provision of apparatus for forcing the pin end of a pipe joint axially into the box end of another pipe joint so that the resultant structure presents a pipeline which requires no welding or screwing of one coacting member to another.

A further object of this invention is the provision of a frame mounted device for manipulating pipe joints in a manner to force a pin end of a pipe joint axially into the box end of another pipe joint so that the resultant series connected pipe joints provide a pipeline which requires no relative turning of one joint about the axial centerline of another joint.

Another and still further object of this invention is the provision of two spaced relatively movable devices for fabricating a pipeline, wherein one device grips a marginal length of a pipe joint while the other device captures a coupling member, and the pin end of the pipe joint is forced axially into the box end of another pipe joint, as the pipeline undergoes construction.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 8 is a fragmentary, detail of part of the apparatus disclosed in FIG. 7;

FIG. 9 shows the apparatus of FIG. 8 in another operative configuration;

DETAILED DESCRIPTION OF THE PREFERRED EMBODIMENT

Figure 1:
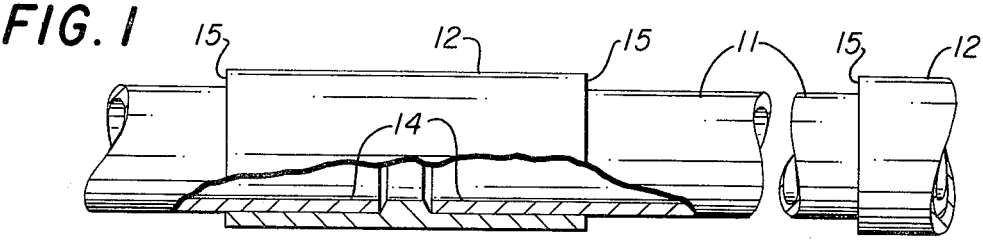
FIG. 1 is a fragmented, part cross-sectional view of a pipeline fabricated in accordance with my co-pending patent application Ser. No. 048,780 filed June 15, 1979.

FIG. 1 discloses a section of a pipeline made up of joints of pipe 11 having the marginal ends thereof forced along the longitudinal axial centerline and into the interior of a coupling 12 in accordance with my co-pending patent application Ser. No. 048,780 filed June 15, 1979. The marginal ends 14 of the pipe are not threaded in the conventional manner, but instead the interface between the pipe end and the coupling are held together by high frictional forces brought about by force-fitting the end of the pipe into a specially grooved inner surface of the coupling member. Numeral 15 indicates opposed shoulders formed by the opposite ends of coupling 12.

The remaining figures of the drawings illustrate apparatus made in accordance with the present invention for fabricating the pipeline of FIG. 1. As seen in FIGS. 2-11 of the drawings, and in particular FIGS. 1-5, the apparatus 16 of this invention includes a main framework having longitudinally disposed skids 18 and 19 which are rigidly tied together by spaced, lateral frame members 20 and 22. Longitudinally disposed parallel guide means in the form of polished guide rods 24 and 26 are supported from the main frame by attaching the opposed marginal ends of the rods to the lateral members as indicated by numerals 28, 29, 30, and 31 in FIG. 4.

A pipe gripper 32 is slidably mounted for low friction, longitudinal movement on the guide rods, with there being opposed hydraulic cylinder assemblies 34 and 36 connected between the pipe gripper and the main frame, so that the pistons 35 and 37 thereof can force the pipe gripper to reciprocate axially respective to a pipe being made up into a pipeline.

Figure 3:
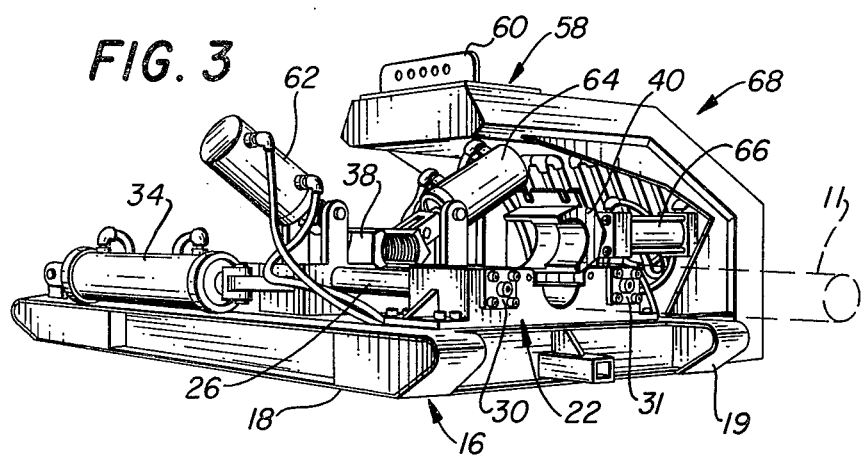
FIG. 3 is a perspective view of apparatus made in accordance with the present invention.
Figure 4:
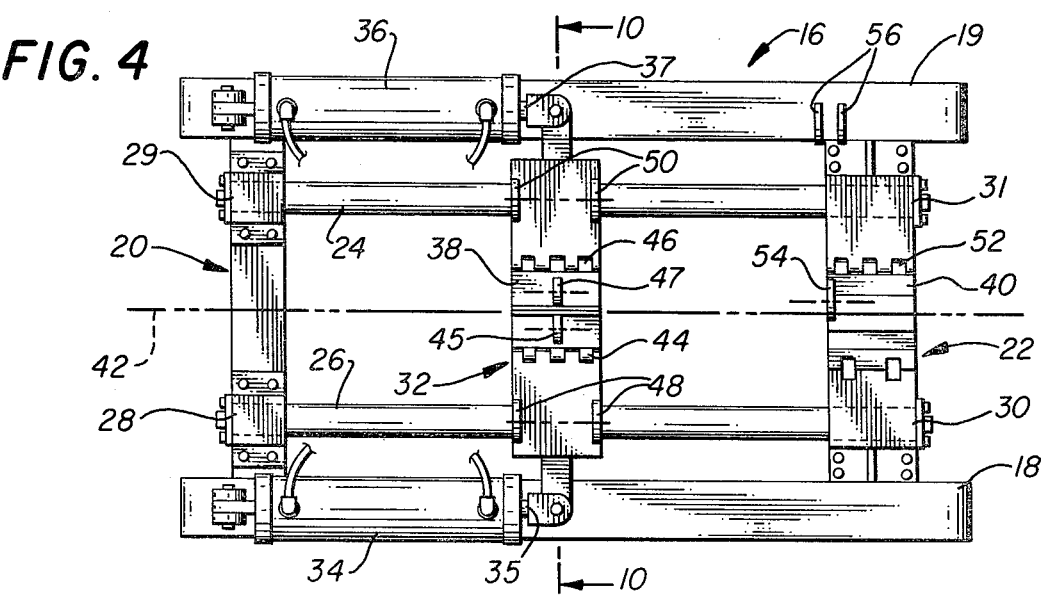
FIG. 4 is a top, plan view of the apparatus disclosed in FIG. 3, with some parts being removed therefrom in order to more clearly disclose some of the details thereof.
Figure 5:
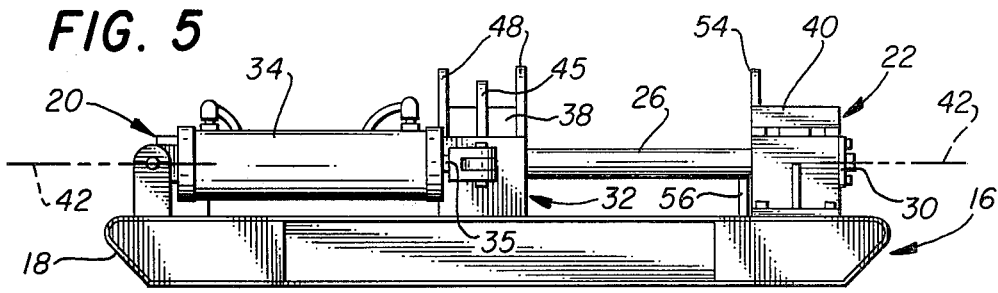
FIG. 5 is a side elevational view of the apparatus disclosed in FIG. 4.
Figure 6:
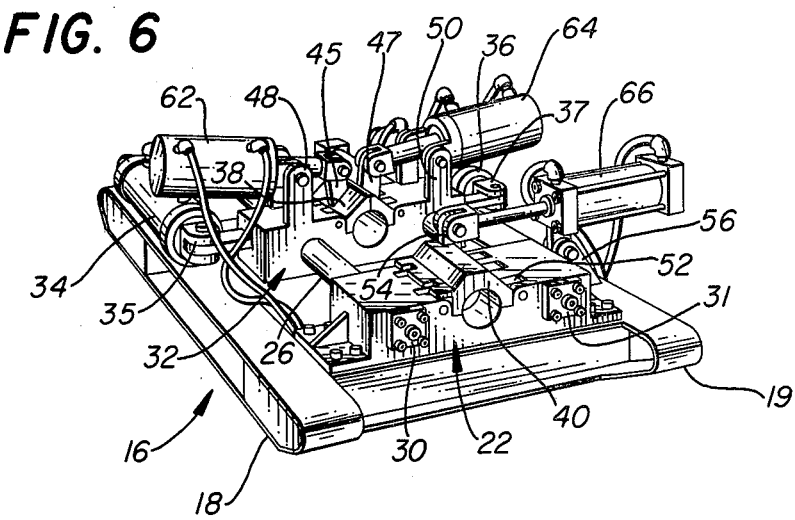
FIG. 6 is a perspective view of the apparatus disclosed in FIGS. 3-5.

As seen in FIGS. 3-5, a bifold slip assembly 38 provides a gripping action about an exterior marginal surface of a pipe, as will be more fully discussed later on in this disclosure.

A fixture 40 for releasably holding a coupling is supported by the lateral frame member 22 such that the axial centerline 42 of the fixture and the pipe gripper lie along a common axial centerline. The fixture is held in fixed relationship respective to the main framework.

The pipe gripper includes doors 43 and 43' having hinges 44 and 46 by which the doors may be folded away from and toward the centerline 42. Lugs 45 and 47 are attached to the bifold doors, while spaced ears at 48 and 50 are attached to the gripper so that a hydraulically actuated cylinder can be placed between the ears and the lugs for actuating the bifold doors between a closed, or pipe gripping position, and an opened, or pipe releasing position.

The door 40 of the coupling fixture is hinged at 52 and includes a lug 54 spaced from a pair of ears 56 to enable a hydraulically actuated cylinder assembly to be interposed therebetween, thereby actuating the door 40 from the closed, or coupling gripping position, to the opened, or coupling releasing position, and vice versa.

FIG. 3 illustrates that the apparatus of the present invention may be provided with a centilever overhanging structure 58 by which the entire apparatus can be hoisted by attachment of a suitable lifting means to the apertured plate member 60. The plate member is located at the static center of gravity.

Cylinders 62 and 64, respectively, are connected between lugs and ears 45, 48 and 47, 50, respectively, for actuating the bifold doors of the pipe gripper 38. The cylinders preferably are pivotally connected to the ears 48 and 50, while the pistons are connected to the lugs 45 and 47.

Hydraulic cylinder assembly 66 is connected between lugs 54 and ears 56 of the door 40. Suitable hydraulic lines are connected between a control console at 68 and the various hydraulic cylinders so that each of the cylinders can be remotely actuated at a safe distance away from the moving parts of the mechanism.

As seen in FIGS. 8 and 9, a marginal length of a joint of pipe has been received within the pipe gripper apparatus 32, and in FIG. 9, the gripper jaws have been actuated from the opened to the closed position by the hydraulic cylinders 62 and 64 to thereby secure the pipe joint to the traveling pipe gripper with great force. The marginal pin end of the pipe is disposed in close proximity to a coupling 12 located within the coupling holding fixture 40.

It will be noted that the fixture includes a large id. portion 70 and a small id. portion 72. The large id. portion snugly encapsulates the exterior of a coupling, with a marginal end of the coupling being directed towards the pin end of the pipe 11, and with the shoulder 74, which is formed between members 70 and 72, engaging the entire shoulder 15 at one end of the coupling. The small id. member 72 of the fixture bears against a pipe which may be contained within the near end of the coupling of FIGS. 8 and 9, and which forms part of the completed pipeline.

Actuation of the cylinders 34 and 36 extends pistons 35 and 37 thereof, thereby causing the pipe gripper to move with great force towards the fixture until the pin end of the pipe joint is forced into the coupling, or box end of the pipeline, which ever the case may be. It is advantageous to apply apoxy resin to the marginal pipe end as noted at 75 in FIG. 2 to provide a sealed bond therebetween.

Thereafter, the cylinders 62, 64, and 66 are actuated to open the doors and release the assembled pipe and coupling, whereupon the machine can be moved into proper position for connecting the next joint of pipe into the pipeline.

Figure 7:
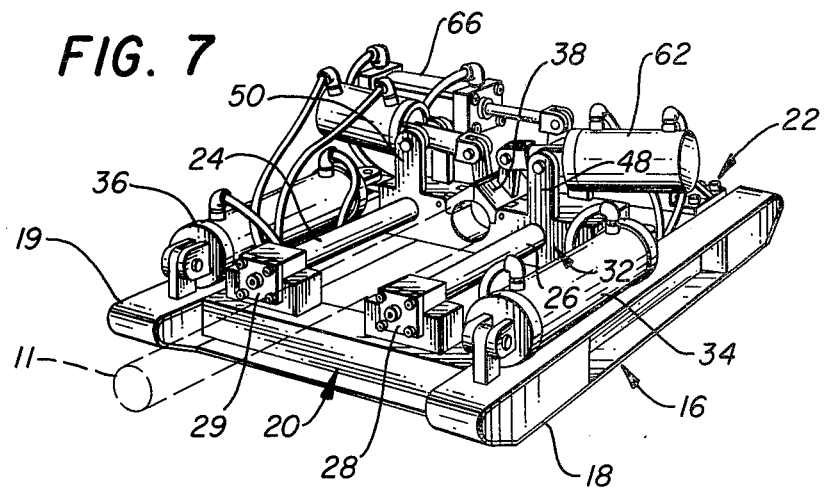
FIG. 7 is another perspective view of the apparatus seen in FIG. 6.

In operation, the preferred embodiment of the invention is carried out by installing couplings on one end of a number of pipe joints in the illustrated manner of FIGS. 7 and 9 so as to eliminate the necessity of carrying out this step in the field. This action provides pipe joints having a pin end and a box end. The apparatus of this invention is skidded along the projected path of the pipeline, with the two longitudinally disposed skids straddling the pipeline ditch. This is best accomplished by lifting the apparatus at 60 by employment of a side boom tractor or the like.

In this preferred form of the invention, a coupling always terminates the pipeline, that is, as joints, of pipe are coupled together, the pin end of the new joint is always mated to the box end of the last connected joint. Thus, the pipeline is built with the gripping device being at the forward end of the apparatus. Therefore, the machine is positioned so that the box end of the pipeline is received in the fixture in a manner similar to the illustration seen in FIGS. 2, 3, and 8. The movable wall 40 is closed by actuating the hydraulic cylinder 66, thereby capturing the last coupling within the fixture. A new joint of pipe is placed within the gripping device with the pin end thereof being placed adjacent to the box end of the pipeline. The doors are closed by actuating the hydraulic cylinders 62 and 64, thereby gripping the pipe with great force.

The hydraulic clyinders 34 and 36 are next actuated to move the pipe gripper device towards the fixture, thereby forcing the pin end of the pipe joint into the box end of the pipeline, and completing the connection between the last joint of the pipeline.

The pistons of the cylinder assemblies are all reciprocated to cause them to stroke in the opposite direction. This action opens the jaws of the gripper device and the door of the fixture, while simultaneously the gripper device moves away from the fixture, and the apparatus is repositioned to cause the last coupling of the pipe line to lie within the fixture. The above sequence of manipulative steps is repeated each time an additional joint of pipe is added to the pipeline.

It should be noted that the diameter of the gripper device and the fixture must be changed in order to accommodate different diameter of pipe.

The present invention couples pipe together in a rapid and safe manner. A considerable savings in the cost of a pipeline is realized by employment of the present method as contrasted to welded or screwed pipe.

Moreover, the outer pipe surface is subjected to less damage as compared to other similar methods.

Figure 10:
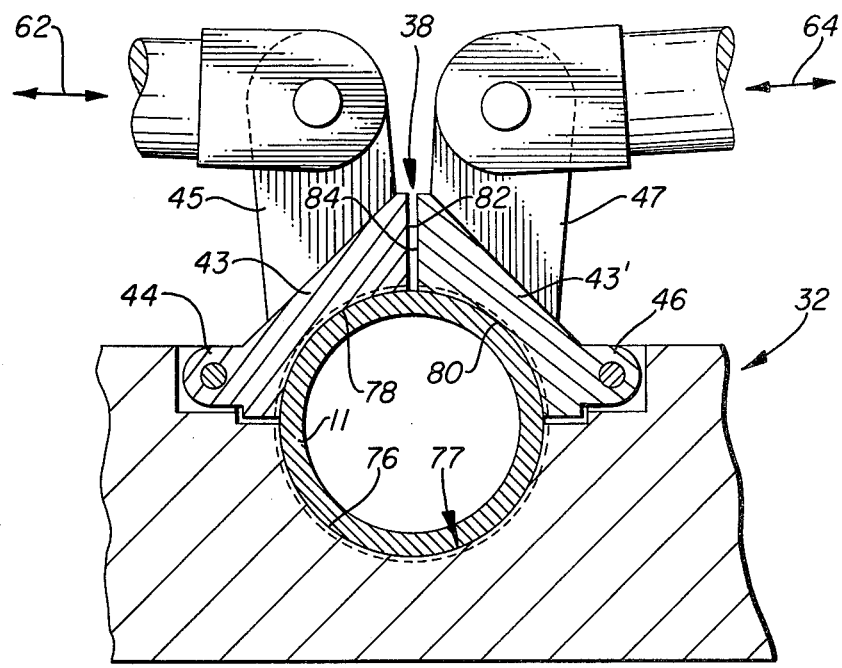
FIG. 10 is an enlarged, cross-sectional view taken along line 10—10 of FIG. 4.
Figure 11:
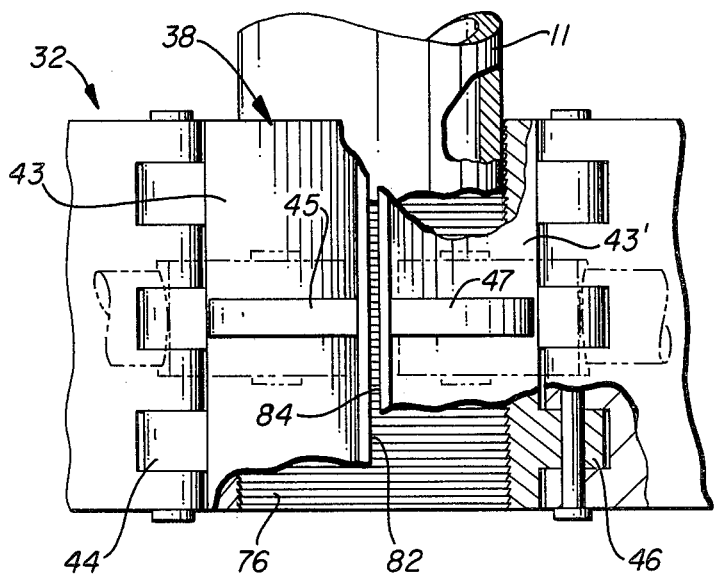
FIG. 11 is a fragmentary, part cross-sectional, top view of the apparatus seen in FIG. 10; and, FIG. 12 is an enlarged, fragmented, cross-sectional representation of part of the apparatus seen in FIG. 11.
Figure 12:
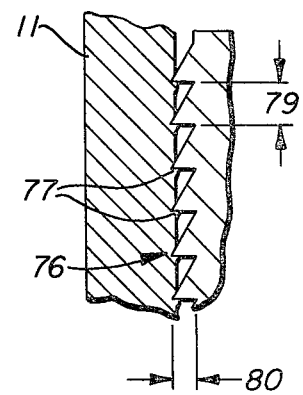

In FIG. 10, the pipe gripper bifold doors cooperate with a lower semicircular die 76 to present a gripping surface 77, and which cooperates with gripping surfaces 78, and 80 to enclose the entire outer periphery of a marginal length of pipe 11 when doors 43 and 43' are closed by hydraulic cylinders 62 and 64 of FIG. 7. The inner surface of the coacting members 76, 78, and 80 are machined to present circumferentially extending gripping teeth, as seen at 76 in FIG. 11, which engage the outer surface of the pipe 0.020–0.040 inches in depth. The abutting edge portions 82 and 84, seen in FIG. 10, are adjusted to prevent the doors from closing more than this specified amount, otherwise the powerful hydraulic cylinders 62 and 64 may injure the outer surface of the pipe, or cause distortion or deformation and possible cracking to occur within the pipe wall. Therefore, the doors 43 and 43' are allowed to close to a definite position, and at this position the saw-toothed cutting edges dig a limited depth into the pipe surface. The area of damage underlying the gripping members 76, 78, and 80 is within the design tolerance of the pipe and is less damaging than would be realized from making up threaded pipe joints of the same pipe material.

The teeth may be cut into the gripping surface of the three members as a continuous thread which spirals from one to the other end of the gripping surface, or the teeth may be endless and adjacent to one another. It is important that the teeth be arranged to dig into the pipe when moved towards the fixture.

Plastic coated pipe and coupling members are assembled together to provide a pipeline having a continuous, undamaged internal coating which cannot be achieved by other known methods.

It is possible to practice this invention by making up the pipeline with the pin end of the pipe joints arranged so that the terminal end of the pipe is always a plain or pin end. The coupling is affixed to one end of the pipe joint, and the pipe joint is joined to the pipeline by reversing the relationship of the pipe gripper and fixture, so that the fixture rather than the pipe gripper is moved relative to the main frame and pipeline. This entails gripping the marginal terminal end portion of the pipeline with the pipe gripper, engaging the coupling member of the next pipe joint with the fixture, and moving the fixture towards the pipe gripper so that the coupling member held within the fixture is forced into fluid tight engagement respective to the pin end of the pipeline.

Figure 2:
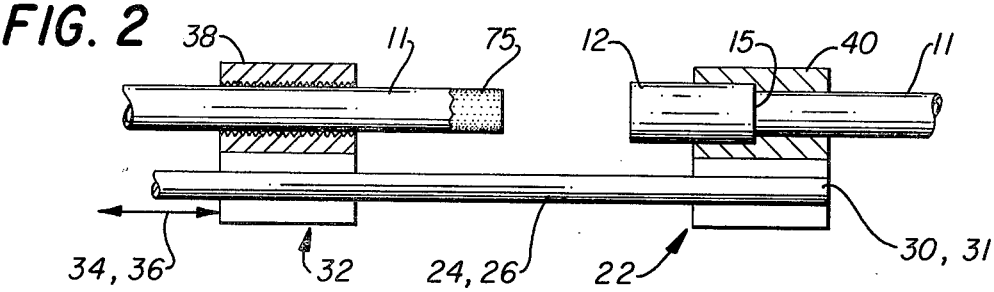
FIG. 2 is a diagrammatical representation of apparatus for fabricating the pipeline of FIG. 1.

Moreover, the present invention can be practiced in conjunction with upset tubular goods, that is, a pipe joint having an enlarged end sized to receive the opposed, relatively smaller end, and wherein one of the marginal pipe ends of a pipe joint have been provided with the aforementioned co-acting gripping surfaces, as seen at 75 in FIG. 2, for example. The box or upset end of the pipe is forced to receive the pin end of another pipe joint therewithin, when the fixture and pipe gripper are forced towards one another. Such a pipe joint is contemplated for use in the present apparatus.

I claim:

1. Apparatus for forcing a marginal end of a pipe joint axially into a marginal end of a pipe coupling wherein said pipe coupling has an inside diameter slightly less than the outside diameter of the pipe joint;

said apparatus includes a main frame; a pipe gripper having a longitudinal bore formed therethrough; said pipe gripper includes a first and second die member movable towards one another for engaging and gripping the external surface of a pipe with great friction, and movable away from one another to release the pipe; means mounting said pipe gripper in supported relationship respective to said main frame;

a coupling holding fixture, means by which said coupling holding fixture is supported respective to said main frame; said fixture having a counterbore which is axially aligned with said longitudinal bore of said pipe gripper, said fixture is spaced from said pipe gripper, said fixture includes a movable member and a fixed member which cooperates together to form the counterbore thereof so that when one member moves towards the other, a pipe coupling is captured in fixed relationship between the members of the fixture;

said main frame includes spaced parallel members and spaced lateral members, said parallel members extend parallel to the axial centerline of the holding fixture and the pipe gripper; said parallel members include means by which they are supported respective to said spaced lateral members; means slidably supported on said parallel members for providing relative movement between said pipe gripper and said fixture along the longitudinal axial centerline thereof;

a hydraulically actuated cylinder assembly supported on said main frame for effecting movement of the means slidably supported on said parallel members;

and control means for actuating said pipe gripper, coupling holding fixture, and hydraulically actuated cylinder;

so that said main frame can be moved along the projected path of a pipeline while joints of pipe are connected together by a coupling member by the action of the apparatus.

2. The apparatus of claim 1 wherein the pipe gripper has an inside surface which includes closely spaced, circumferentially extending grooves formed thereon which are about 0.020–0.040 inches in depth, and the gripper has a length which is at least twice the diameter of the pipe.

3. The apparatus of claim 1 wherein said hydraulic cylinder and said holding fixture are fixed relative to said lateral members; and said pipe gripper is connected to be moved by said hydraulic cylinder.

4. Apparatus for fabricating a pipeline, wherein the pipeline is made up of threadless joints of pipe having opposed ends forced axially into coupling members to provide a pipeline;

said apparatus comprising a main frame movable along the projected path of a pipeline to be constructed; a pipe gripper device mounted to said main frame; said pipe gripper device includes a plurality of dies which move toward and away from one another to grip and release a marginal length of a pipe with great force; means moving said pipe gripper device in a reciprocating manner respective to said main frame;

a coupling holding fixture device mounted to said main frame, said fixture device includes a movable wall member which enables a pipe coupling member to be releasably captured in mounted relationship therewithin until the movable wall member is retracted whereupon the coupling member is released; and, means for moving the movable wall member towards and away from a coupling member which may be located within said fixture device;

parallel, spaced guide members supported by said main frame, means reciprocatingly mounting said pipe gripper in a slidable manner respective to said guide members such that the axial centerline of the gripper lies along the axial centerline of the fixture;

a hydraulically actuated cylinder assembly connected between said main frame and said pipe gripper for effecting relative movement between said pipe gripper device and said fixture device along a path which is parallel to the longitudinal axial centerline of the pipeline so that a pipe joint can be gripped by said pipe gripper device, a coupling member can be held in captured relationship within said fixture device in axial alignment therewith, and the pipe gripper device moved respective to the fixture device so that one end of a pipe joint can be forced to move axially into a coupling member of another pipe joint to thereby make up a string of pipe;

remote control means for causing the dies of the pipe gripper to grip and release the pipe, for causing movement of said movable wall, and for controlling the operation of the hydraulic cylinder assembly;

whereupon the apparatus can move along the surface of the ground while pipe joints are connected together by a coupling member to form a pipe line.

5. The apparatus of claim 4 wherein said pipe gripper device includes a plurality of movable wall members which are hinged to a fixed member, with there being an elongated passageway formed therebetween;

the interior of said passageway being formed of a multiplicity of grooves which engage the outer pipe surface, the grooves having a depth of 0.020–0.040 inches, and the passageway having a length which is twice the diameter of the pipe.

* * * * *

UNITED STATES PATENT AND TRADEMARK OFFICE
CERTIFICATE OF CORRECTION

PATENT NO. : 4,328,608
DATED : May 11, 1982
INVENTOR(S) : JACK E. GIBSON

It is certified that error appears in the above—identified patent and that said Letters Patent is hereby corrected as shown below:

Column 2, line 65, "FIGS. 1-5" should read --FIGS. 2-5--;
Column 3, line 2, "means" should read --members--; line 39, "centilever" should read --cantilever--.

Signed and Sealed this

Fifth Day of October 1982

[SEAL]

Attest:

GERALD J. MOSSINGHOFF

Attesting Officer   Commissioner of Patents and Trademarks